(12) United States Patent
Stluka et al.

(10) Patent No.: US 7,908,300 B2
(45) Date of Patent: Mar. 15, 2011

(54) GUIDED ENTRY SYSTEM FOR INDIVIDUALS FOR ANNOTATING PROCESS DEVIATIONS

(75) Inventors: Petr Stluka, Prague (CZ); Petr Cisar, Suchdol Nad Luznici (CZ); Jiri Rojicek, Prague (CZ)

(73) Assignee: Honeywell International Inc., Morristown, NJ (US)

( * ) Notice: Subject to any disclaimer, the term of this patent is extended or adjusted under 35 U.S.C. 154(b) by 415 days.

(21) Appl. No.: 12/061,540

(22) Filed: Apr. 2, 2008

(65) Prior Publication Data

US 2009/0254551 A1 Oct. 8, 2009

(51) Int. Cl.
*G06F 7/00* (2006.01)
*G06F 17/30* (2006.01)
*G06F 13/14* (2006.01)

(52) U.S. Cl. ......... 707/805; 707/790; 707/802; 707/803

(58) Field of Classification Search ............... 707/999.1, 707/790, 802, 803, 805; 706/2–16; 382/190
See application file for complete search history.

(56) References Cited

U.S. PATENT DOCUMENTS 7,284,009 B2 * 10/2007 Perrow .................................. 1/1
2009/0228499 A1 * 9/2009 Schmidtler et al. ........... 707/100
* cited by examiner

*Primary Examiner* — Cam Y Truong
*Assistant Examiner* — Cecile Vo
(74) *Attorney, Agent, or Firm* — Jetter & Associates, P.A.

(57) ABSTRACT

Methods (100), algorithms, and implementing systems (200) for guided annotation of process deviations by an individual responsible for annotations (e.g. process operator) for a manufacturing process having an associated computing system (210) including a historical database (stored in memory 219). The historical database is provided (101) including data associated with a plurality of process performance measures including stored deviations for the plurality of process measures, stored quantitative deviation attributes thereof and at least one cause associated with each of the stored deviations process performance measures. The method includes the individual responsible for annotation selecting at least one present deviation (D) to be annotated responsive to a deviation in a target process performance measure (T) selected from the plurality of process measures (102). Automatically, the stored quantitative attributes associated with D, T, and a target value or target interval for T are retrieved (103). The database is searched to identify a plurality of similar deviations from the stored deviations determined to be similar to D and the plurality of similar deviations are statistically processed to generate a listing indicating a relative likelihood of the at least one cause associated with the plurality of similar deviations (104). The listing is presented to the individual to prompt selection of at least one present cause for D from the cause(s) associated with the plurality of similar deviations (105).

18 Claims, 3 Drawing Sheets

GUIDED ENTRY SYSTEM FOR INDIVIDUALS FOR ANNOTATING PROCESS DEVIATIONS

FIELD OF THE INVENTION

Embodiments of the present invention relate to methods and systems for recording process deviations associated with manufacturing processes.

BACKGROUND

Operation of individual process units in a manufacturing process, such as at an industrial plant, is generally supervised by process operators. The process operators are responsible for meeting production targets, such as determined by the planning department, and complying with existing safety, environmental and other constraints. Operators are generally organized into shifts that regularly rotate in time, such as three (3) eight (8) hour shifts per day. Deviations from expected target parameter behavior often indicative of process problems are generally automatically detected and recorded during each shift. These deviations include deviations from production targets that violate certain imposed upper or lower limits, or a focus value. When the shift changes, recording of deviation is generally closed and a responsible individual, usually an operator, and in some cases shift supervisors, technicians or process engineers, are requested to provide annotations (including reason(s)) why the specific deviations occurred during their shift.

Typically, operators can enter one or more reasons for each deviation, and indicate the severity (or priority) of the deviation as being high/medium/low. This information can be used by process engineers, head operators and other production staff for periodic reviews to identify significant process problems and analyze why they occurred to determine actions to prevent or minimize future deviations.

However, responsible individuals are known to minimize efforts regarding entry of reasons for deviations, which can result in missing annotations. Another problem is consistency of annotations. Specifically, the same problem can be explained differently by the same responsible individual at a different time, and explained differently by different responsible individuals even at the same time, such as due responsible individuals from various teams who have different experience/understanding of the process. What is needed is a new methodology and associated system for making entry of annotations for process deviations more consistent.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

The present invention concerns methods, algorithms, and implementing systems for guided annotation of process deviations by a responsible individual for a manufacturing process having an associated computing system including a historical database. The responsible individual is generally an operator, but can also be a shift supervisor, technician, or process engineer. The historical database comprises data associated with a plurality of process performance measures including stored deviations for the plurality of process measures, stored quantitative deviation attributes thereof and at least one cause associated with each of the stored deviations. As used herein, the phrase "process performance measures" also includes process parameters and process variables. The method comprises the individual selecting at least one present deviation (D) to be annotated responsive to a deviation in a target process performance measure (T) selected from the plurality of process measures, retrieving the stored quantitative attributes associated with D, T, and a target value or target interval for T, and searching the database to identify a plurality of similar deviations from the stored deviations determined to be similar to D. The plurality of similar deviations are statistically processed to generate a listing indicating a relative likelihood of the at least one cause associated with the plurality of similar deviations. The listing is presented to the individual to prompt selection of a present cause for D from the at least one cause associated with the plurality of similar deviations.

FIGURES

DETAILED DESCRIPTION

Figure 1:
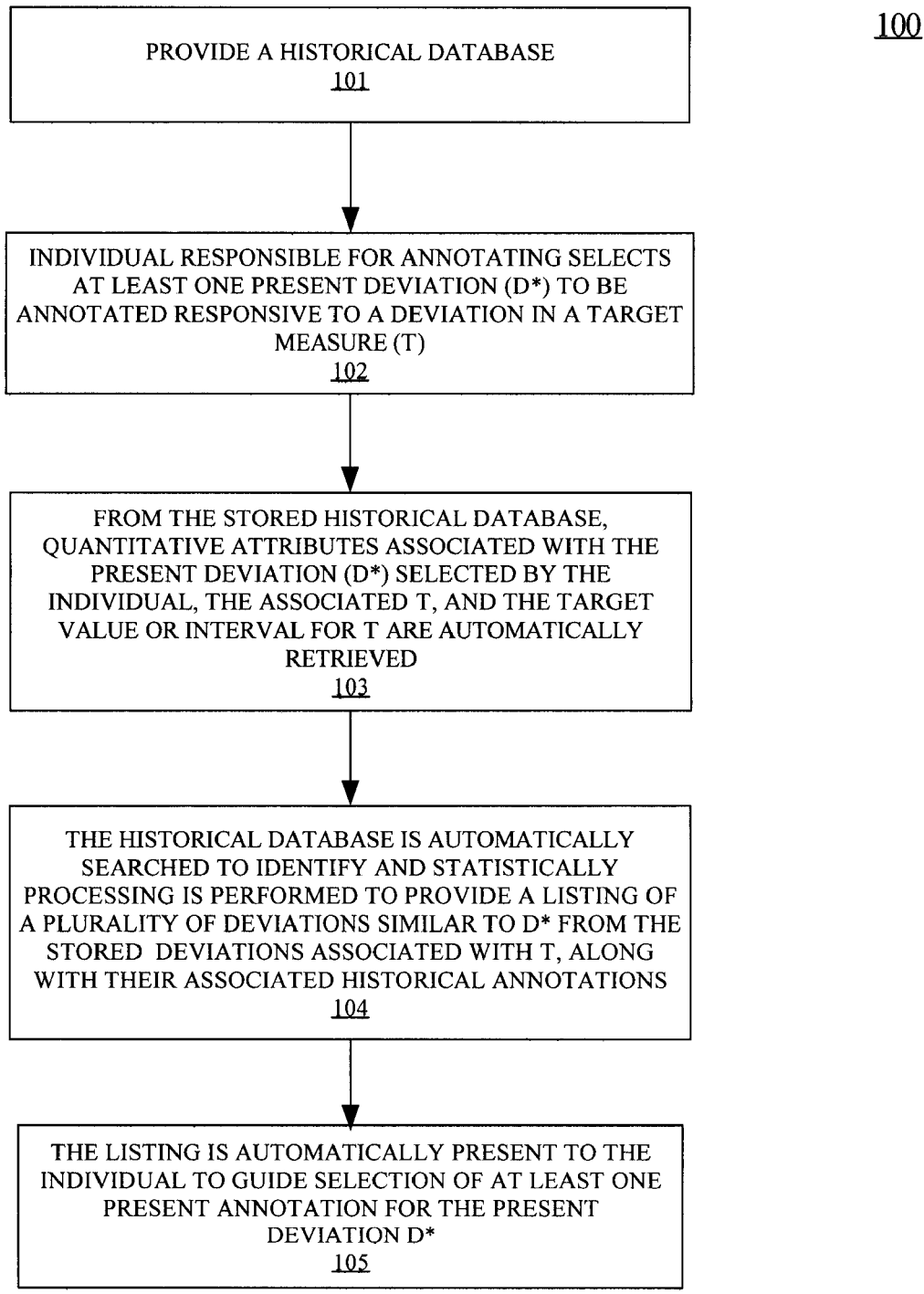
FIG. 1 is a flow chart for an exemplary method for guiding individuals for entry of annotations for process deviations, according to an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

The invention concerns methods, algorithms, and related implementing systems that support the annotation process by improving the consistency of annotation entries responsive to process deviations. The annotations generally comprise one or more descriptive causes of process deviations. A historical database is generally utilized that includes data associated with a plurality of process performance measures including stored deviations for various process performance measures, stored quantitative attributes thereof, and at least one cause associated with each of the stored deviations. By looking back to the data stored in the historical database, a list of the most likely reasons for a given abnormal process behavior (e.g. operational problems, deviations, and product qualities being off specification) can be automatically generated, which can then be presented in a dialog form to the individual (e.g. operator, shift supervisor, technician or process engineer) to guide the individual's entries to improve the consistency of the annotation process.

The invention will now be described more fully hereinafter with reference to accompanying drawings, in which illustrative embodiments of the invention are shown. This invention, may however, be embodied in many different forms and should not be construed as limited to the embodiments set forth herein. For example, the present invention can be embodied as a method, a data processing system, or a computer program product. Accordingly, the present invention can take the form as an entirely hardware embodiment, an entirely software embodiment, or a hardware/software embodiment.

FIG. 1 is a flow chart for an exemplary method 100 for guiding individuals for entry of annotations for process deviations, according to an embodiment of the invention. In step 101 a historical database is provided. The historical database generally includes a plurality of target process performance measures (T) comprising production parameters (e.g. target volume of a product, target product mix, target purity of a product), process parameters (e.g. reflux ratio, riser temperature), and key performance indicators (KPIs) (e.g. specific energy consumption for given process unit, total number of alarms during the shift), deviation (D) data associated with the Ts, and annotations (A) for the deviations (D). The target process performance measures (T) can each have assigned a single target value X or a target interval <Xmin, Xmax>. The Deviation D of a target T is generally characterized by N>1 quantitative deviation attributes d={d1, ..., dN}. Some exemplary quantitative deviation attributes can be: $d_1$=duration, $d_2$=magnitude; $d_3$=economic impact, $d_4$=type of deviation (e.g. being above (+) or below (−) the focus value, below lower limit, or above upper limit). Other deviation attributes can be defined. Annotations (A) of a deviation D can be characterized by M>1 annotation attributes a={a1, ..., aM}. Some exemplary annotation attributes can be: a1=reason code (e.g. representing equipment leakage, or impurities in feedstocks); a2=.classification (e.g. deviation causing safety issues, environmental issues, or degraded product quality). Other annotation attributes can be defined.

In step 102, an individual (e.g. the process operator) selects at least one present deviation (D*) to be annotated responsive to a deviation in a target (T) selected from the plurality of process performance measures. The individual generally selects a particular deviation (D*) to be annotated, such as part of the shift hand-over process at the end of the shift. For example, one target (T) can be dielectric thickness and the present deviation (D*) the dielectric thickness being from 10 to 20% too thick (e.g. 14 microns), for a dielectric thickness parameter (T) that is specified to be in a range from a thickness 1 (e.g. 10 microns) to thickness 2 (e.g. 12 microns). In step 103, an algorithm according to an embodiment of the invention generally automatically collects information from the historical database including quantitative deviation attributes {d1, ..., dN} for the selected deviation D*, information about the target T and its target value X or target interval <Xmin, Xmax>. This information will be used for the similarity search described below relative to step 104.

In step 104, the historical database is automatically searched to identify and provide a listing of a plurality of deviations similar to D* from stored deviations associated with T along with their associated historical annotations. Statistical processing is generally performed on the plurality of similar deviations to generate a listing which indicates a relative likelihood of the respective causes associated with the plurality of similar deviations. "Similarity" as used herein is generally defined as proximity of two deviations measured over their multiple quantitative attributes (e.g. duration, magnitude). The similarity can be defined over complete set of deviations attributes {d1, ..., dN}, or alternatively only on a selected subset of the deviation attributes {d1, ..., dN}. The general definition of similarity can include tolerances {h1, ..., hN} defined for each deviation attribute {d1, ..., dN}. Defined in this way, a historical deviation Dh is similar to the current deviation D* if:

$|dh1-d*1|<h1$ and $|dh2-d*2|<h2$ ... and $|dhN-d*N|<hN$

Stated differently, differences for the respective deviation attributes {d1, ..., dN} are within tolerances if < the corresponding h value. Parameters {h1, ..., hN} are referred to as tolerances and are generally specified in advance. The algorithm can use default values of tolerances, or values adjusted by a process engineer or other authorized user. Tolerances control the number of deviation attributes considered to be similar, and are generally alterable, such as by the process engineer.

Similarity between deviations for a given target process performance measure can be defined as geometrical proximity of two operating multidimensional points and in one embodiment can be implemented in form of a distance function. One distance function that can be used is a Euclidean distance or Euclidean metric which is the "ordinary" distance between two points that one would measure with a ruler, which can be proven by repeated application of the Pythagorean theorem. By using this formula as distance, Euclidean space becomes a metric space (even a Hilbert space). Other distance functions can be used as well, for instance those defined by the Minkowski metrics family. Similar historical deviations for the given process performance measure and their associated reasons (annotations) are retrieved from the historical database that is stored in memory. The historical database is generally stored in a "database system" that can have form of either relational database (generally most typical), or a file system. The database system can be physically stored on a computer hard drive. The set of similar historical deviations and their annotated reasons is then statistically processed to provide a listing ordered in terms of likelihood, such as with accompanying percentages. The ordered list of retrieved possible annotated reasons, such as with respective percentages can then be presented to the operator, wherein the percentages are a measure of how well the historical annotation is computed to explain the current deviation.

Similarity can be measured in a variety of ways. For example, one definition of similarity can be based on Euclidean distance, wherein all points that satisfy the constraint indicated below can be considered similar:

$$d^2 = \sum_{i=1}^{N} \left(\frac{d_{hi} - d_i}{h_i}\right)^2 \leq 1$$

Using the formula above, each retrieved similar historical deviation Dh satisfies the constraint that its squared Euclidean distance $d^2$ from the current deviation summed over the deviation attributes is less than a constant, such as ≤1. Consequently, to each historical deviation Dh its associated annotation Ah can be assigned a weight w based on the squared Euclidean distance $d^2$. The weight (w) can be computed using a specific kernel function, such as the Gaussian kernel function w=exp(−9$d^2$/2) or other kernel function such as uniform, bi-weight, tri-weight, Epanechnikov. As a result, a set of historical annotations Ah each having respective assigned weights w can be generated. Some of the annotations included in the set can be same.

The set can be statistically processed by computing probability distribution over all included annotations Ah. As a result, each particular annotation can be assigned a probability. This is a measure of how well the historical annotation Ah explains the current deviation D. Step 104 concludes when a listing of similar historical deviations Dhj are retrieved from memory together with their associated historical annotations Ahj, along with their respective probabilities in one embodiment of the invention.

In step 105 the listing is presented to the individual to guide selection of at least one present annotation (cause) for the present deviation D* from the causes provided in the listing. The individual is generally allowed to assign more than one reason to the current deviation, although this is not typical. Hypotheses about possible causes of the current deviation D* (e.g. statistically processed historical annotations Ah found for similar historical deviations Dh) are thus presented to the user. Expressed by probability, the presentation can be in the form of a list sorted by the probability calculated in the previous step, such as annotation 1: reason 1, percentage 1;
annotation 2: reason 2, percentage 2 (percentage 2<percentage 1);
annotation 3: reason 3, percentage 3 (percentage 3<percentage 2<percentage 1).

The individual can select the annotation that is most likely (e.g. first on the list, having the highest percentage), or others on the list. The individual can then be guided by the listing and select the annotation(s) that is (are) most likely (e.g. first on the list), or one of the others on the list. Alternatively, the individual can enter a new annotation if none of the listed annotations are believed to satisfactorily explain the cause currently observed process deviation.

Figure 2:
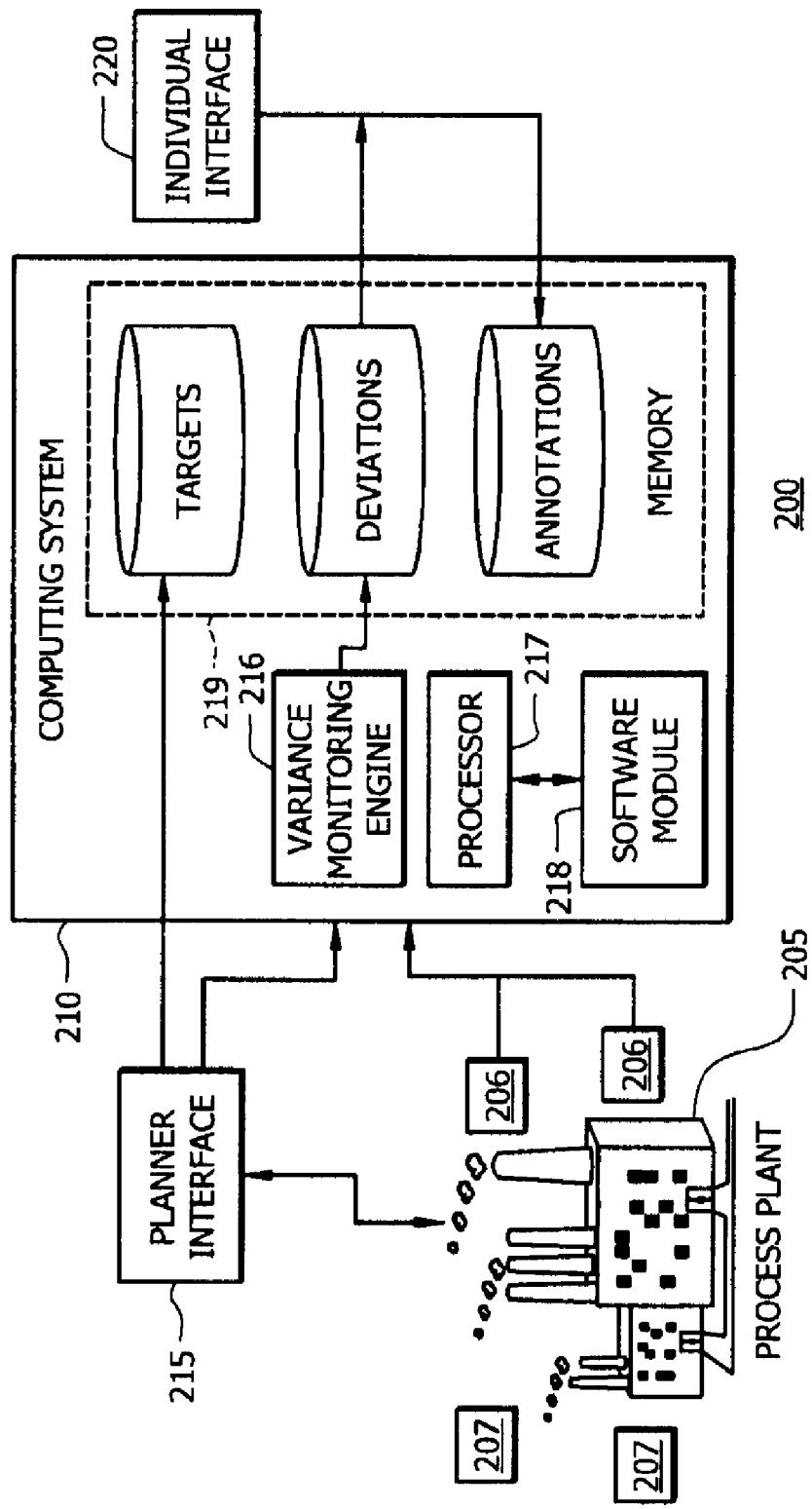
FIG. 2 is a high level representation of a system comprising a manufacturing or processing plant having a guided individual entry system for annotating process deviations, according to an embodiment of the invention.

FIG. 2 is a high level representation of a system 200 comprising a manufacturing or processing plant 205 having a guided individual entry computing system 210 for annotating process deviations, according to an embodiment of the invention. Plant 205 comprises a plurality of sensors 206 for reporting actual real-time parametric values. Sensors 206 are operable for obtaining values for a plurality of target process performance measures (T) comprising production, process parameters and key performance indices (KPIs). A plurality of actuators 207 control various aspects of the process run by plant 205. A planner interface 215 for authorized users (e.g. process planners) is connected to plant 205, such as for creating production instructions and changing production limits and production targets. Planner interface 215 is also coupled to computing system 210. Computing system 210 comprises variance monitoring engine 216 and processor 217. Software module 218, which generally is loaded with algorithms according to embodiments of the invention, is coupled to processor 217. Computing system 210 also includes memory 219, which is shown including a stored historical database comprising target performance measures, deviations and annotations. Individual interface 220 is coupled to the computing system 210 which is operable for entering annotations for deviations as well as viewing information stored in the historical database, including historical deviation data. Memory 219 can be any type of physical machine-readable storage medium.

Deviations from target values or target intervals are generally systematically and automatically detected by variance monitoring engine 216, and written into memory 219 associated with computing system 210 and stored together with quantitative attributes associated with the target measures, such as start time, end time, duration, magnitude of deviation, and economic impact. Annotations stored in memory 219 may have several attributes such as the reason code (e.g. from a pre-defined list of reasons) and classification (e.g. also from pre-defined list). The pre-defined lists of attributes are generally extendable by authorized users such as operators, shift supervisors, or process engineers.

The algorithm that can be stored in software module run by processor 217 associated with the computing system 210 generally reads the stored quantitative deviation attributes of the selected deviation (D*), such as duration, magnitude, economic impact, and type of deviation. The algorithm can then search the historical database stored in memory 219 to identify similar deviations that occurred for the same process performance measure as described above relative to method 100.

Figure 3:
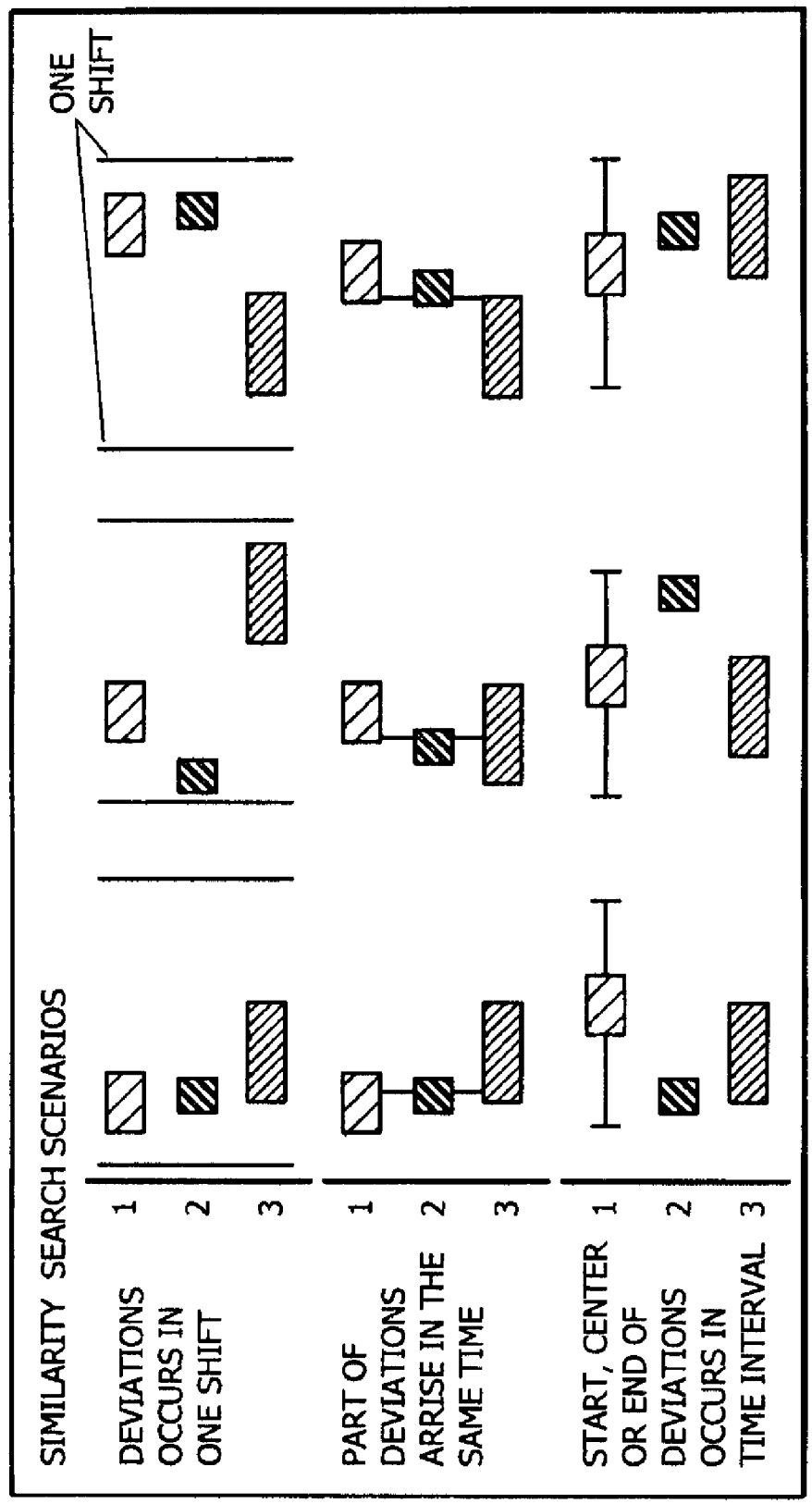
FIG. 3 depicts several similarity search scenarios for co-occurrences of deviations for multiple target process performance measures.

In an alternate embodiment of the invention, the similarity search performed is based on co-occurrences of deviations (D) for multiple target process performance measures (T). Co-occurrence of deviations can be defined in a plurality of different ways, including for example co-occurrence occurring within one shift, deviations that overlap in time, and a specific time before/after the deviations. FIG. 3 depicts several similarity search scenarios for co-occurrences of deviations (D) for multiple target process performance measures (T), where 1, 2 and 3 represent target process performance measures $T_1$, $T_2$ and $T_3$, respectively. The top depiction shows the co-occurring deviations occurring during one shift. The middle depiction shows part of the co-occurring deviations arising at the same time. The bottom depiction shows the start, the center or the end of the co-occurring deviations occurring in an interval of time.

In the co-occurrence search the similarity can defined over multiple ($k \geq 2$) deviations D co-occurring on multiple k target process performance measures T. The search condition can be extended by adding additional deviation attributes. For example, in the case of two deviations there will be 2N conditions for two sets of deviation attributes {d1, ..., dN}. Otherwise, the formulation follows the single occurrence search method described relative to FIG. 1, using either tolerances, or a distance such as an Euclidean distance. The multi-deviation search may be considered to be a multivariate search because it is defined on multiple Ts, while the standard similarity search may be considered a univariate search as it is defined based on one T.

In another embodiment of the invention, relative positions of deviations can also be added to the search condition. For example, the extra search condition can be defined as a particular sequence of start times of individual deviations. Thus, deviations can be co-occurring and also form a specific sequence, such as 1-3-2. Accordingly, a specific condition may be added that could require that deviation 1 starts first, followed by deviation 3, and the sequence being closed by deviation 2.

The algorithms described herein can be used as a software module that is connected to a historical repository of targets, deviations and annotations, such as shown in FIG. 2 described above. The software module can be launched on demand by the operator during the annotation process, typically taking place at the end of a shift.

Embodiments of the invention can be used to support continuous improvement of plant or unit operation, including large scale plants, such as nuclear, thermal or hydraulic, electric power, iron and steel, a chemical or petrochemical, plant and water treatment, oil refining, pharmaceutical, paper-making and gas processing.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In particular regard to the various functions performed by the above described components (assemblies, devices, circuits, systems, etc.), the terms (including a reference to a "means") used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and/or the claims, such terms are intended to be inclusive in a manner similar to the term "comprising."

In light of the forgoing description of the invention, it should be recognized that the present invention can be realized in hardware, software, or a combination of hardware and software. Any kind of computer system, or other apparatus adapted for carrying out the methods described herein, is suited. A typical combination of hardware and software could be a general purpose computer processor, with a computer program that, when being loaded and executed, controls the computer processor such that it carries out the methods described herein. Of course, an application specific integrated circuit (ASIC), and/or a field programmable gate array (FPGA) could also be used to achieve a similar result.

The present invention can also generally be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following: (a) conversion to another language, code or notation; (b) reproduction in a different material form. Additionally, the description above is intended by way of example only and is not intended to limit the present invention in any way, except as set forth in the following claims.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the following claims.

We claim:

1. A method for guided annotation of process deviations by an individual for a manufacturing process, comprising:
   providing said manufacturing process having an associated computing system including a historical database comprising real-time parametric data associated with a plurality of process performance measures and values from a plurality of actuators for controlling aspects of said manufacturing process, including stored deviations for said plurality of process performance measures, stored quantitative deviation attributes thereof and at least one cause associated with each of said stored deviations;
   said individual selecting at least one present deviation (D) to be annotated responsive to a deviation in a target process performance measure (T) selected from said plurality of process performance measures;
   retrieving, by using a computer, said stored quantitative attributes associated with said D, said T, and a target value or target interval for said T;
   searching said database to identify a plurality of similar deviations from said stored deviations determined to be similar to said D;
   statistically processing said plurality of similar deviations to generate a listing indicating a relative likelihood of said at least one cause associated with said plurality of similar deviations, and
   presenting said listing to said individual, and
   said individual completing an annotation for said deviation in said T by selecting a present cause for said D from said at least one cause associated with said plurality of similar deviations.

2. The method of claim 1, wherein said relative likelihood comprises a percentage probability.

3. The method of claim 1, wherein said statistical processing comprises determining similarity between said present deviation (D) and said stored deviations based on a distance function.

4. The method of claim 3, wherein said distance function comprises a Euclidean distance function.

5. The method of claim 4, wherein said similar deviations are selected from said stored deviations which have deviation attributes provide said Euclidean distance relative to deviation attributes of said present deviation (D) being less than a constant.

6. The method of claim 1, wherein searching step comprises searching over a selected subset of said plurality of deviation attributes.

7. The method of claim 5, further comprising the step of assigning a weight based on said Euclidean distance for each of said similar deviations.

8. The method of claim 7, wherein said weight is computed using a kernel function.

9. The method of claim 8, wherein said kernel function comprises a Gaussian, a uniform, a bi-weight, a tri-weight, or an Epanechnikov kernel function.

10. The method of claim 1, wherein said searching comprises similarity searching based on a co-occurrence of two or more of said present deviations (D) for a plurality of said multiple target process performance measures (T).

11. The method of claim 10, wherein said searching further comprises an additional search condition, said additional search condition based on a selected sequence of start times for individual ones of said two or more of said present deviations (D).

12. A machine readable storage medium for guided annotation of process deviations by an individual for a manufacturing process having an associated computing system, and having stored thereon computer program codes when executed by a computing system cause the computing system executes a method comprising:

allowing said process individual to select at least one present deviation (D) to be annotated responsive to a deviation in a target process performance measure (T) selected from said plurality of process performance measures;

retrieving said stored quantitative attributes associated with said D, said T, and a target value or target interval for said T;

searching said database to identify a plurality of similar deviations from said stored deviations determined to be similar to said D;

statistically processing said plurality of similar deviations to generate a listing indicating a relative likelihood of said at least one cause associated with said plurality of similar deviations, and presenting said listing to said individual to prompt selection of a present cause for said D from said at least one cause associated with said plurality of similar deviations, wherein, the associated computing system including a historical database comprising real-time parametric data associated with a plurality of process performance measures and values from a plurality of actuators for controlling aspects of said manufacturing process, including the stored deviations for a plurality of process performance measures, stored quantitative deviation attributes thereof and at least one cause associated with each of said stored deviations.

13. The machine readable storage medium of claim 12, wherein said relative likelihood comprises a percentage probability.

14. The machine readable storage medium of claim 12, wherein said statistical processing comprises determining similarity between said present deviation (D) and said stored deviations based on a distance function.

15. The machine readable storage medium of claim 14, wherein said distance function comprises a Euclidean distance function.

16. The machine readable storage medium of claim 15, further comprising code for assigning a weight based on said Euclidean distance for each of said similar deviations.

17. The machine readable storage medium of claim 12, wherein said code for searching comprises code for similarity searching based on a co-occurrence of two or more of said present deviations (D) for a plurality of said multiple target process performance measures (T).

18. A manufacturing system having guided individual entry for annotating process deviations, comprising:

a processor; a memory;

a manufacturing or processing plant comprising a plurality of sensors for reporting real-time parametric values including values for a plurality of process performance measures and a plurality of actuators for controlling aspects of a manufacturing process run by said manufacturing or processing plant;

a computing system coupled to said plant comprising a variance monitoring engine, processor and software module, and memory including a stored historical database comprising data associated with said plurality of process performance measures including stored deviations for said plurality of process performance measures, stored quantitative deviation attributes thereof and at least one cause associated with each of said stored deviations, and an individual interface coupled to said computing system operable for entering annotations for deviations as well as for said individual viewing information stored in said historical database, including historical deviation data, wherein said software module includes:

code for allowing said individual at said individual interface to select at least one present deviation (D) to be annotated responsive to a deviation in a target process performance measure (T) selected from said plurality of process performance measures;

code for retrieving said stored quantitative attributes associated with said D, said T, and a target value or target interval for said T;

code for searching said database to identify a plurality of similar deviations from said stored deviations determined to be similar to said D;

code for statistically processing said plurality of similar deviations to generate a listing indicating a relative likelihood of said at least one cause associated with said plurality of similar deviations, and code for presenting said listing at said individual interface for said individual to prompt selection of a present cause for said D from said at least one cause associated with said plurality of similar deviations;

wherein said codes are stored on a physical machine-readable storage medium.

* * * * *